(No Model.)
E. H. MALOON & M. E. BLAKE.
PLOW ATTACHMENT.
No. 494,212. Patented Mar. 28, 1893.
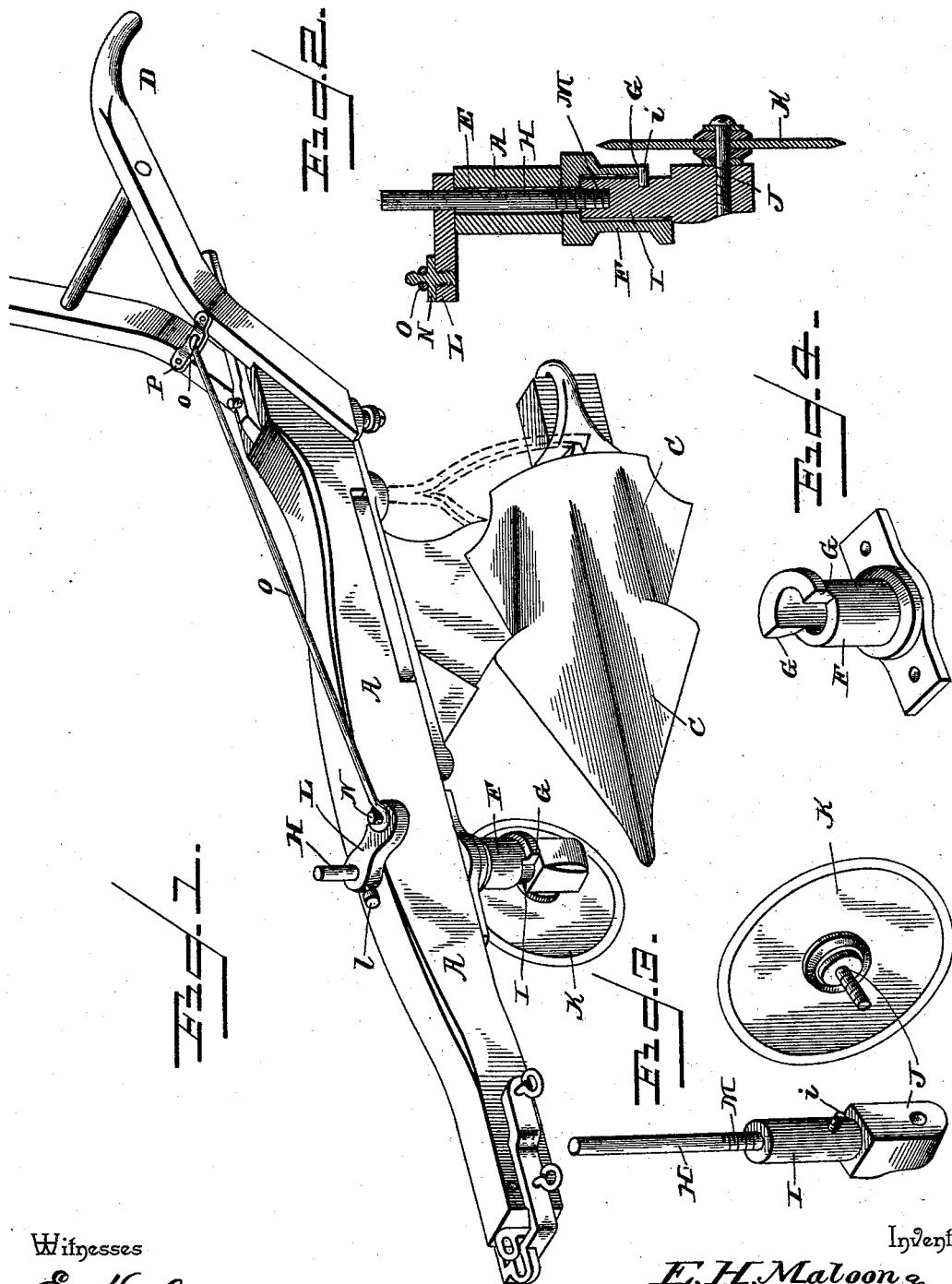
Witnesses
E. K. Stewart
L. P. Wolhaupter
Inventors
E. H. Maloon and
M. E. Blake,
By their Attorneys,
C. A. Snow & Co.
THE NORRIS PETERS CO., PHOTO-LITHO., WASHINGTON, D. C.

UNITED STATES PATENT OFFICE.

EDGAR H. MALOON AND MARSHALL E. BLAKE, OF MEREDITH, NEW HAMPSHIRE.

PLOW ATTACHMENT.

SPECIFICATION forming part of Letters Patent No. 494,212, dated March 28, 1893.

Application filed December 7, 1892. Serial No. 454,381. (No model.)

*To all whom it may concern:*

Be it known that we, EDGAR H. MALOON and MARSHALL E. BLAKE, citizens of the United States, residing at Meredith, in the county of Belknap and State of New Hampshire, have invented a new and useful Adjustable Colter Attachment for Side-Hill and other Plows, of which the following is a specification.

This invention relates to plow attachments; and it has for its object to provide an improved adjustable colter attachment that is especially designed to be used in connection with side hill or turning plows.

To this end the invention primarily contemplates certain improvements in devices of this character, whereby the cutting wheel or colter can not only be adjusted vertically as desired, but is also adapted to be adjusted in a line with the point of the plow slightly to the landside thereof, when the same is reversed to either side of the plow standard, thereby providing an adjustable colter which leaves the mold board free to take more work.

With these and other objects in view which will readily appear as the nature of the invention is better understood, the same consists in the novel construction, combination and arrangement of parts hereinafter more fully described illustrated and claimed.

In the accompanying drawings:—Figure 1 is a perspective view of a side hill or reversible plow having a colter attachment constructed in accordance with this invention. Fig. 2 is a vertical transverse sectional view through the attachment. Fig. 3 is a detail in perspective of the pivot bolt or shank and the colter wheel slightly separated therefrom. Fig. 4 is a similar view of the shouldered bearing socket.

Referring to the accompanying drawings:—
A represents the plow beam carrying an ordinary reversible plow C, and having connected to the rear end thereof the handles D. The plow beam A, is provided in advance of the plow with the bearing perforation E, extending therethrough and in alignment with the attached bearing socket F. The attached bearing socket F, is tubular in cross-section and of larger diameter than the bearing perforation through the plow-beam. Said bearing socket is removably clamped to the under side of the plow beam, and is provided at the lower end and at one side thereof with a cut-away portion which forms the opposite stop shoulders G.

The bearing perforation through the plow beam receives for rotation the pivot bolt or shank H, extending entirely therethrough and carrying upon its lower end the enlarged bearing collar I, which snugly fits within and has a bearing in the tubular socket F, and is limited to a one-half revolution or turn therein by means of the stop pin $i$, projecting from one side of said collar and adapted to engage either one of the stop shoulders G, of said bearing socket at the end of a half-turn so as to accurately stop the colter in the proper position. At the extreme lower end of the collar and at one side thereof is the journal spindle J, on which is mounted for rotation the circular cutting disk or colter K, which is designed to precede the plow point to serve the usual function of clearing away weeds, switch grass, &c. As illustrated in the drawings, it will be seen that when the stop pin bears against either one of the opposite shoulders G, according to the position of the reversible plow, the colter is held in a direct line with the plow beam and to the landside of the point of the plow so as to cause the latter to take more work.

Adjustably secured to the upper projecting end of the pivot bolt or shank projecting above the plow beam is the crank arm L. The crank arm L, is held fast to said pivot bolt or shank by means of the set screw $l$, which provides means for a slight vertical adjustment of the colter attachment if so desired, by reason of the fact that the lower end of the pivot bolt or shank H, is threaded as at M, so as to adjustably engage the bearing collar which it carries, thereby allowing the adjustment of the upper end of said bolt or shank above the beam to be taken up by the crank arm. The crank arm L, is provided at its outer end with the crank pin N, which receives one end of the operating or turning rod O. The operating or turning rod O, is provided with a right angularly disposed locking end $o$, which is designed to drop into the perforated locking bar or strip P, secured transversely to the plow handles at the rear end of the beam. By lifting the locking end of the rod O, out of the perforated locking bar, and pulling or shoving the same, the colter can be shifted to either side of the plow beam according to the position of the plow as described.

Changes in the form, proportion and the minor details of construction may be resorted to without departing from the principle or sacrificing any of the advantages of this invention, and it will of course be understood that the colter is equally as well adapted for use in conjunction with land side plows, and also can be attached to iron beam plows as well as wood beam plows, thus adapting the colter for use in connection with any suitable plow.

Having thus described our invention, what we claim, and desire to secure by Letters Patent, is—

1. The combination in a plow, of the beam having a bearing perforation therethrough in advance of the plow, a pivot bolt or shank mounted in said perforation, and having a lower threaded end an operating crank arm adjustably clamped to the upper projecting end of the said pivot bolt or shank, a bearing collar adjustably fitting the lower threaded end of said bolt or shank, and a rotary cutter or colter journaled on said collar, substantially as set forth.

2. The combination in a plow, of the beam having a perforation in advance of the plow, a bearing socket secured to the under side of the plow beam in alignment with the perforation therein, a pivoted bolt or shank mounted in said perforation, a bearing collar adjustably secured to the lower end of said bolt or shank and turning in said socket, a rotary cutter or colter journaled on said collar, and means for turning said pivot bolt or shank, substantially as set forth.

3. The combination in a plow, of the beam having a bearing perforation in front of the plow, an enlarged tubular bearing socket attached to the under side of the beam in alignment with the perforation therein and provided with opposite stop shoulders, a pivot bolt or shank working in the perforation in the plow beam and having a lower threaded end, a bearing collar engaging said threaded end and having a laterally projecting stop pin and a spindle, a rotary cutter or colter journaled on said spindle and adapted to be aligned with either side of the plow beam and to the landside of the point of the plow, a crank arm adjustably clamped to the upper projecting end of the pivot bolt or shank, a turning rod loosely connected to said crank arm at one end and having a right angularly disposed locking end, and a suitably arranged perforated locking bar adapted to receive said locking end, substantially as set forth.

In testimony that we claim the foregoing as our own we have hereto affixed our signatures in the presence of two witnesses.

EDGAR H. MALOON.
    MARSHALL E. BLAKE.

Witnesses:
 DANIEL E. EATON,
 PERRY A. ELLSWORTH.